US012059862B2

(12) United States Patent
Gunduz

(10) Patent No.: US 12,059,862 B2
(45) Date of Patent: Aug. 13, 2024

(54) METHOD AND DEVICE FOR FORMING A FOLD IN AN OVERWRAPPING FILM

(71) Applicant: JT International S.A., Geneva (CH)

(72) Inventor: Hakan Gunduz, Izmir (TR)

(73) Assignee: JT International S.A. (CH)

( * ) Notice: Subject to any disclaimer, the term of this patent is extended or adjusted under 35 U.S.C. 154(b) by 196 days.

(21) Appl. No.: 17/441,771

(22) PCT Filed: Apr. 28, 2020

(86) PCT No.: PCT/EP2020/061779
§ 371 (c)(1),
(2) Date: Sep. 22, 2021

(87) PCT Pub. No.: WO2020/221754
PCT Pub. Date: Nov. 5, 2020

(65) Prior Publication Data
US 2022/0176672 A1 Jun. 9, 2022

(30) Foreign Application Priority Data
May 2, 2019 (EP) .................................... 19172370

(51) Int. Cl.
*B31B 70/26* (2017.01)
*B31B 70/86* (2017.01)
*B65D 85/10* (2006.01)

(52) U.S. Cl.
CPC ............ *B31B 70/262* (2017.08); *B31B 70/87* (2017.08); *B65D 85/10* (2013.01)

(58) Field of Classification Search
CPC ........ B31B 70/262; B31B 70/87; B65D 85/10
See application file for complete search history.

(56) References Cited

U.S. PATENT DOCUMENTS 259,280 A * 6/1882 Stocking ................. B31B 70/56 493/246
387,573 A * 8/1888 Appel ..................... B31B 70/56 493/266

(Continued)

FOREIGN PATENT DOCUMENTS

CN 1064238 A 9/1992
CN 102205667 A 10/2011

(Continued)

OTHER PUBLICATIONS

Search Report dated Nov. 11, 2022 from the Office Action for Chinese Application No. 202080031149.X issued Nov. 25, 2022, 3 pages.

(Continued)

*Primary Examiner* — Lucas E. A. Palmer
(74) *Attorney, Agent, or Firm* — Lerner David LLP

(57) ABSTRACT

An apparatus for producing a filmic packaging material having a continuously folded portion includes a first component having a protruding part; a first roller rollable on its longitudinal axis, the first roller provided with a recess on its outer surface for receiving the protruding part; a drive mechanism for moving the material along a path in a manner such that a continuous portion of the material is drawn into the recess of the first roller by the protruding part of the first component such that the continuous portion of the material is folded, forming a continuously folded portion having an overlapping surface due to the arrangement of the protruding part of the first component in relation to the recess of the first roller; a bonding component provided downstream of the first roller arranged to adhere together the overlapping surface of the continuously folded portion of the material.

20 Claims, 5 Drawing Sheets

(56) References Cited

U.S. PATENT DOCUMENTS

| | | | | |
|---|---|---|---|---|
| 666,854 | A * | 1/1901 | Muenzenmaier | B31B 50/56 493/336 |
| 1,402,584 | A * | 1/1922 | Elrod | D06J 1/10 223/32 |
| 2,114,625 | A * | 4/1938 | Bergstein | B29C 66/1352 156/218 |
| 2,786,616 | A * | 3/1957 | Cady | D06J 1/10 38/144 |
| 3,664,238 | A * | 5/1972 | Baxter | B65D 33/02 493/190 |
| 3,791,185 | A * | 2/1974 | Knudson | B21D 5/08 72/181 |
| 4,205,504 | A * | 6/1980 | Gregoire | B31B 70/262 53/284.3 |
| 4,256,023 | A * | 3/1981 | Vodarich | B31B 70/00 493/266 |
| 4,368,051 | A * | 1/1983 | Lehmacher | B31B 70/00 493/926 |
| 4,398,903 | A * | 8/1983 | Lehmacher | B26D 1/065 493/227 |
| 4,606,784 | A * | 8/1986 | Glans | B65H 45/08 156/499 |
| 4,629,524 | A * | 12/1986 | Ausnit | B29C 66/474 156/244.11 |
| 4,708,704 | A * | 11/1987 | Focke | B31B 50/444 493/911 |
| 5,167,897 | A * | 12/1992 | Weber | B29C 55/023 264/290.2 |
| 5,184,388 | A * | 2/1993 | Nieradka | F16C 17/06 29/434 |
| 5,236,408 | A * | 8/1993 | McAdam, III | B29C 66/83413 493/135 |
| 5,549,539 | A * | 8/1996 | Rautenberg | B31F 1/10 493/402 |
| 5,554,093 | A * | 9/1996 | Porchia | B65D 33/255 493/243 |
| 5,784,915 | A * | 7/1998 | Allemann | B21D 5/16 72/51 |
| 6,142,923 | A * | 11/2000 | Bakoledis | B31B 50/00 492/30 |
| 6,280,372 | B1 | 8/2001 | Focke et al. | |
| 10,967,601 | B2 * | 4/2021 | Boegli | B31F 1/07 |
| 11,008,133 | B2 * | 5/2021 | Johansson | B65D 5/4266 |
| 2008/0242526 | A1 * | 10/2008 | Fuchs | B31F 1/10 493/241 |
| 2009/0301158 | A1 * | 12/2009 | Hermann | B21D 39/021 72/379.2 |
| 2010/0098354 | A1 * | 4/2010 | Fraser | B31B 50/26 383/105 |
| 2012/0134606 | A1 * | 5/2012 | Borchardt | B65D 33/28 156/196 |
| 2012/0214657 | A1 * | 8/2012 | Fraser | B31B 70/88 493/243 |
| 2013/0199710 | A1 | 8/2013 | Ishikawa et al. | |
| 2014/0059977 | A1 * | 3/2014 | Boegli | B31B 50/00 53/411 |
| 2014/0270587 | A1 * | 9/2014 | Schreiter | B65D 33/255 493/214 |
| 2014/0378286 | A1 * | 12/2014 | Borchardt | B32B 27/20 493/189 |
| 2017/0080668 | A1 * | 3/2017 | Takeuchi | B31F 1/08 |
| 2017/0106619 | A1 * | 4/2017 | Wilcoxen | B31B 70/64 |
| 2018/0194099 | A1 * | 7/2018 | Wilcoxen | B29C 66/73322 |
| 2019/0030851 | A1 * | 1/2019 | Rodman | B65D 75/563 |
| 2019/0160856 | A1 * | 5/2019 | Middelberg | B65H 45/14 |
| 2020/0055637 | A1 * | 2/2020 | Petkovsek | B31B 70/8131 |
| 2020/0368995 | A1 * | 11/2020 | Wilcoxen | B32B 27/308 |
| 2022/0040952 | A1 * | 2/2022 | Wieduwilt | B31B 70/64 |
| 2022/0204216 | A1 * | 6/2022 | Ferracane | B65D 33/00 |
| 2022/0219889 | A1 * | 7/2022 | Stiglic | B31B 70/10 |

FOREIGN PATENT DOCUMENTS

| | | | |
|---|---|---|---|
| CN | 206659174 | U | 11/2017 |
| CN | 208086936 | U | 11/2018 |
| CN | 208338954 | U | 1/2019 |
| FR | 2571755 | A1 | 4/1986 |
| GB | 2101565 | A | 1/1983 |
| TW | 201339056 | A | 10/2013 |

OTHER PUBLICATIONS

International Search Report for Application No. PCT/EP2020/061779, dated Jul. 21, 2020, 3 pages.

* cited by examiner

METHOD AND DEVICE FOR FORMING A FOLD IN AN OVERWRAPPING FILM

CROSS-REFERENCE TO RELATED APPLICATIONS

The present application is a national phase entry under 35 U.S.C. § 371 of International Application No. PCT/EP2020/061779, filed Apr. 28, 2020, published in English, which claims priority to European Application No. 19172370.9 filed May 2, 2019, the disclosures of which are incorporated herein by reference.

TECHNICAL FIELD OF THE INVENTION

The present invention relates to a device and a method for producing filmic packaging material having a new generation tear-opening feature. In particular, the packaging material may be an overwrapping polyethylene (OP) film or a plastic film for packing items such as cigarettes packs. The overwrapping filmic packaging material of the present invention eliminates the need for a conventional tear-tape to open packages wrapped therewith.

BACKGROUND OF THE INVENTION

Traditional cigarettes packs are usually wrapped in a filmic overwrapping packaging material. The overwrapping packaging material is used in particular to protect the pack and its content from external environment during storage and until sale to consumers. It furthers serves as a tamper evidence for consumers as one need to break open the overwrapping material before accessing the products in the pack. Such an overwrap film is not only used in the cigarette pack but also used in other products, for instance packages of chewing gum, CD, VCD, biscuits, envelope, and other consumer goods.

To provide for a simple and ease of opening, standard overwrapping films have a tear-tape provided on the overwrap film. The tear-tape or also known as tear strip or tear-off ribbon is a narrow tape attached on the inner surface of on overwrap filmic packaging material to provide convenience to the users to open the wrapped product.

A way to provide the tear-tape to the plastic film is for instance using a plain tear-tape. The plain tear-tape is the first generation of tear-tape where the tear-tape is adhered onto the plastic film in a bath of heated wax. Temperature must be carefully adjusted to avoid either burning of wax or cooling of wax. Nevertheless, the melted wax produces smoke and is dangerous to the operators of the packaging machine and to the workers of the whole factory.

Another alternative to this method is the wax-coated tear-tape. The wax is pre-coated on the surface of tear-tape during the manufacturing of tear-tape. Although it is not necessary to equip a wax bath to the machine but only requires heating the iron to melt the pre-coated wax on the tear-tape, it has its own disadvantage, for example the heat-energy received by pre-coated wax varies with the speed of the packaging machine, thus causes the heating of the wax uneven. It can also be the case that the wax is often overheated and therefore led to the breakage of tear-tape and sometimes it is under heated to melt the wax.

A further alternative to the method is the so-called pressure-sensitive (self-adhesive) tear-tape. Such type of tear-tape is the most advanced tear-tape and is widely used nowadays, as it avoids the shortcomings of plain tear-tape and wax-coated tear-tape. The pressure-sensitive tear-tape is manufactured by coating adhesives on the tear-tape during the production of tear-tape.

Although this kind of tear-tape has eliminated the need for a wax bath, warm up time and heating up of the wax, a new generation of overwrap package is envisaged in order to allow the production of the overwrap packaging in a more efficient manner as well as to provide a lower production cost.

SUMMARY OF THE INVENTION

The inventors of the present invention have found solutions to the above-discussed problems by introducing the newly invented device and the improved method as claimed presently. Thanks to the novel design of the device, a filmic packaging material having a continuously folded portion in replacement of a conventional tear-tape is provided. A new generation tear-opening feature produced from a portion of the filmic packaging material itself, allowing a simple and easy production while ensuring a low production cost as the traditional tear-tape is eliminated. Elimination of standard tear-tapes not only improves production costs but also, eliminates the need for operators to regularly replace rolls of tear-tape during production when the existing roll is used up, thereby offering leaner and safer operating conditions.

In a first aspect of the invention, it is provided an apparatus for producing a filmic packaging material having a continuously folded portion, comprising a first component comprising a protruding part; a first roller rollable on its longitudinal axis X, wherein the first roller comprises a recess on its outer surface, preferably extending around its entire circumference, for receiving the protruding part of the first component; a drive mechanism for moving the filmic packaging material along a path in such a way that a continuous, substantially linear, portion of the filmic packaging material is drawn (forced, pushed) into the recess of the first roller by the protruding part of the first component such that the continuous portion of the filmic packaging material is folded, forming a continuously folded portion having an overlapping surface due to the arrangement of the protruding part of the first component in relation to the recess of the first roller; a bonding component being provided downstream of the first roller and arranged to adhere together overlapping surfaces of the continuously folded portion of the filmic packaging material to form an integrated tear-opening portion into the filmic packaging material.

In a second aspect of the invention, it is provided a method of producing filmic packaging material having a continuously folded portion, comprising the steps of: (a) Providing a filmic packaging material in between a first roller having a recess on its outer surface, preferably extending around its entire circumference, and a first component having a protruding part, preferably further with a tipping end; (b) Feeding through the filmic packaging material between the first roller and the first component; (c) Drawing in a continuous portion of the filmic packaging material to the recess region of the first roller by the protruding part of the first component; (d) Folding the continuous portion of the filmic packaging material, forming an overlapping surface of the filmic packaging material; (e) Adhering the overlapping surface of the folded portion of the filmic packaging material, preferably by heating or slightly melting the filmic packaging material or providing a sticky material.

Disclosed herein is a filmic packaging material having a continuously folded portion obtainable by the process according to the method described herein is provided.

Disclosed herein relates to an item wrapped in a filmic packaging material according to the present invention, wherein said filmic packaging material and said continuously folded portion extend substantially circumferentially about said item. Preferably a free end of the continuously folded portion of filmic material is accessible and graspable as an opening tip or tab at a surface of the filmic packaging material such that a user can seize it to tear the filmic packaging open in use.

According to an embodiment of the invention, the first component is a second roller, comprising said protruding part on an outer surface thereof, said second roller pivoting about a longitudinal axis (X') parallel to the longitudinal axis of the first roller. This allows the filmic packaging material to be fed in smoothly between the two rollers.

According to another embodiment of the invention, the pair of rollers can be arranged in such a way that each of the roller spins on its longitudinal axis (X), the continuously folded portion having an overlapping surface formed while the rollers feed in the filmic packaging material there between, wherein the second roller is preferably arranged as an upper pressing roller. This ensures that the filmic packing material can be fed in smoothly and without any unwanted creases.

According to another embodiment of the invention, the one or more folded portions have a substantially Z shape in a transversal section to a longitudinal traveling direction of the filmic packaging material. The folded portion, which is in "Z" form in a transversal section of the filmic packaging material, is thicker than a remaining, unfolded part of the filmic packaging material, thus the folded portion serves as a tearing guide allowing tearing of the filmic packaging material along a border of the folded portion.

According to one embodiment of the invention, the protruding part of the first component, and the recess of the first roller can be provided either in a repeated interval along their respective circumferences or extending along their entire circumferences, arranged in such a way that the protruding part and the recess are substantially complimentary to each other so as to allow for the formation of the folded portion in the filmic packaging material.

According to one embodiment of the invention, the protruding part can be provided in a wedge shape arranged tilted towards one side, wherein the protruding part of the first component is receivable by the recess of the first roller having a substantially complimentary shape to the protruding part so as to allow the formation of the continuously folded portion of the filmic packaging material. Such shapes allow the filmic packaging material to be folded without being torn by other component of the device itself.

According to one embodiment of the invention, the width of the recess can be between about 0.5 mm and 5 mm, preferably between about 0.8 mm and 3 mm, or more preferably between about 1 mm and 2 mm. The width of the formed continuously folded portion corresponds largely to the width of recess.

According to one embodiment of the invention, the one or more additional roller (third, fourth, fifth . . . ) which are capable of spinning at its longitudinal axis (X) can be provided to the apparatus such as to allow the filmic packaging material to be extended properly for the purpose of folding, adhering, reeling up and/or unreeling.

According to one embodiment of the invention, the bonding component can be provided in form of a roller, a nozzle or a block which can be static or rollable, preferably on its longitudinal axis.

According to one embodiment of the invention, the bonding component is capable of exerting heat or providing a sticky material to the filmic packaging material. By exerting heat to the folded portion, said portion of the filmic packaging material can be heat-melted and adhered together. By providing sticky material such as glue or self-adhesive material, the overlapping surface forming folded portion can be adhered together.

According to one embodiment of the invention, wherein the filmic packaging material comprises a first face and a second face, wherein the overlapping surface forming one or more folded portions can be adhered first face to first face, or second face to second face.

According to one embodiment of the invention, further comprising a step of reeling up the folded and adhered filmic packaging material.

According to one embodiment of the invention, the filmic packaging material has a continuously folded portion, wherein the continuously folded portion has one, two or up to five overlapping surfaces, wherein the width of the overlapping surface is between about 0.5 mm and 5 mm, preferably between about 0.8 mm and 3 mm, more preferably between about 1 mm and 2 mm or most preferably about 1 mm.

BRIEF DESCRIPTION OF THE DRAWINGS

The following drawings are not necessarily drawn to scale, emphasis instead is generally being placed upon illustrating the principles of various embodiments. In the following description, various embodiments of the invention are described with reference to the following drawings.

DETAILED DESCRIPTION OF THE INVENTION

Figure 1:
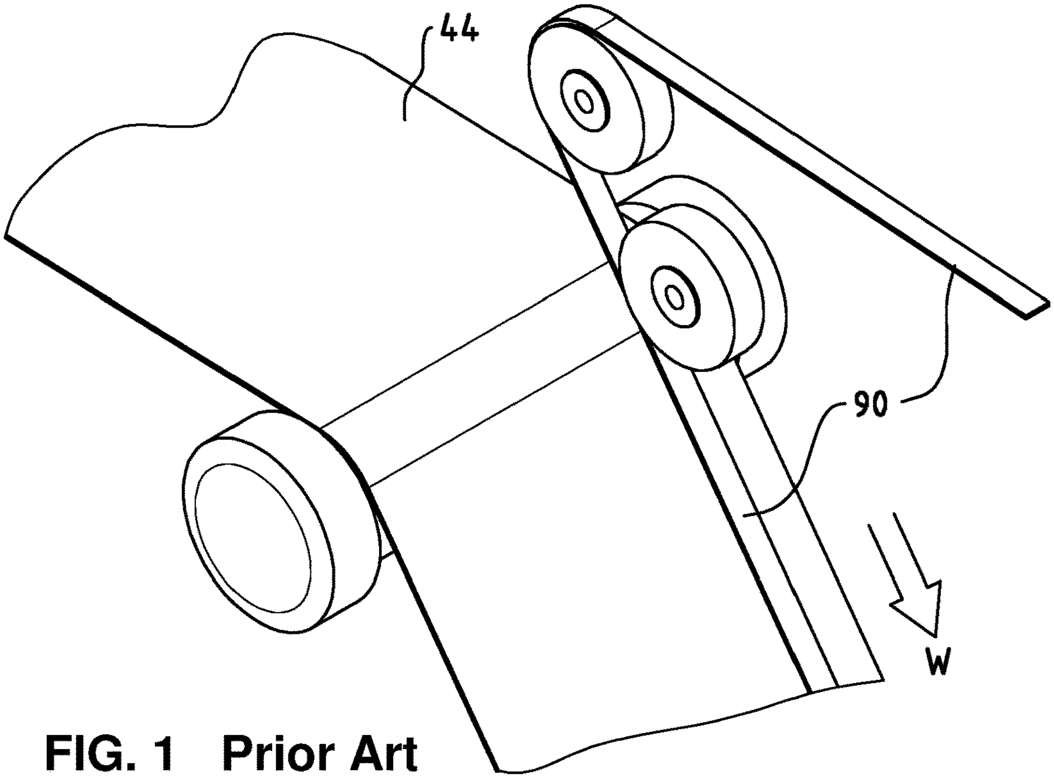
FIG. 1 Prior Art
FIG. 1 shows perspective view of a prior art device and a method to produce a conventional filmic packaging material having a tear-tape adhered thereon.

FIG. 1 shows of a prior art device for the adhesion of a conventional tear-tape 90 to a filmic packaging material 44 during overwrapping process of packaged items such as cigarettes packs. As can be seen in the FIG. 1, both the filmic packaging material 44 and the tear-tape 90 are being fed in by respective rollers, each rotatable on its own centre axis. Both the tear-tape 90 and the filmic packaging material 44 are moved in a direction along a path W, wherein the tear-tape 90 is arranged above the filmic packaging material 44. The tear-tape 90 is provided with a self-adhesive material on one side (facing the filmic packaging material) such that with the assistance of a press roller, the tear-tape 90 is adhered to the filmic packaging material 44, thus forming a conventional filmic packaging material having tear-tape.

Figure 2:
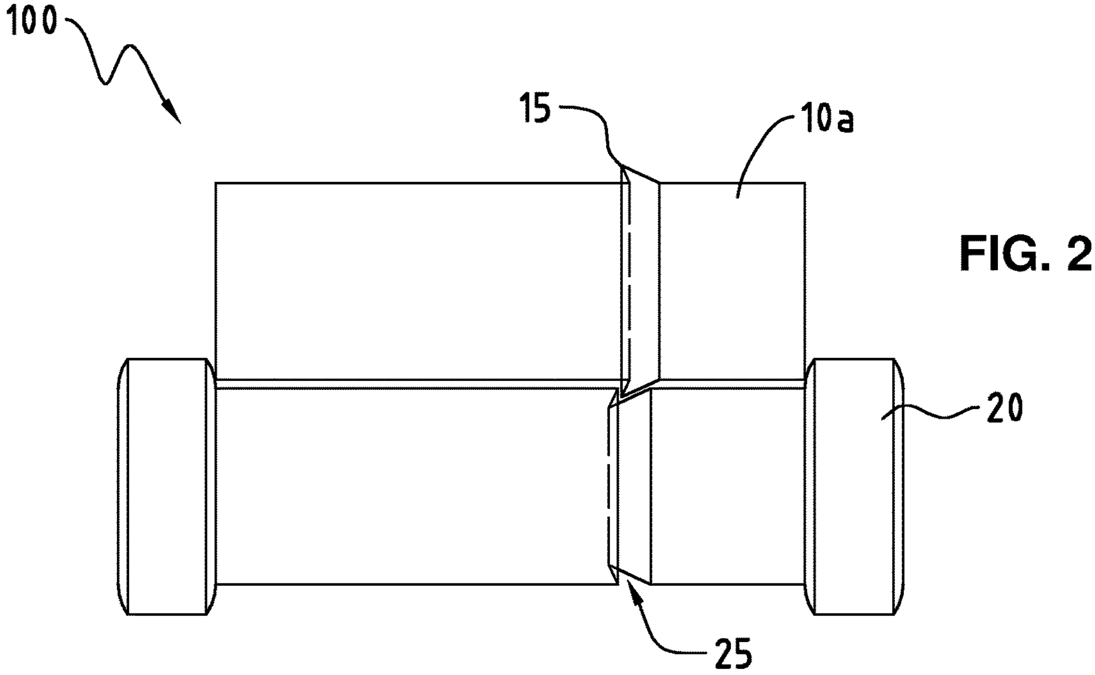
FIG. 2 shows a front view of a rollers arrangement for forming a continuous folded portion as a tear-opening feature in a filmic packaging material according to a preferred embodiment of the apparatus 100 of the present invention.

FIG. 2 shows an embodiment of the apparatus 100 of the present invention where a recess or groove 25 is provided to the entire circumference of a first roller 20. The first component 10 in form of a roller 10*a* having a protruding part 15 provided on its entire circumference is arranged on top of the first roller 20. The protruding part 15 of the second roller 10*a* is arranged in a relatively close contact with the recess 25 of the first roller 20, allowing the filmic packaging material 44 to be passed through there between, as can be seen in the perspective view of the FIG. 3.

It can be foreseen that the protruding part not only can be provided on the entire circumference of the second roller 10*a* but also in a repeated interval on a longitudinal position, for instance two, three, four or more protruding parts 15 are provided around the circumference of the second roller 10*a*, distant from each other either evenly or not evenly. Similar number of grooves corresponding to the number of protruding parts 15 can be provided such that when both the rollers 10*a*, 20 rotate on their longitudinal axes (X) towards each other, the grooves of the first roller 20 accept the protruding parts of the second roller, and the filmic packaging material 44 can be folded, forming a folded portion.

A drive mechanism, for example an automatic rolling and/or conveying system, can be provided to the apparatus 100 for moving the filmic packaging material 44 along a path W in a manner that a continuously folded portion 45 of the filmic packaging material 44 is folded thanks to the arrangement of the protruding part 15 of the second roller 10*a* and the recess 25 of the first roller 20.

After a portion of the filmic packaging material 44 has been folded forming a continuously folded portion 45, a bonding component 30 provided downstream to the first roller 20 is used to harden, preferably by adhesion, the overlapping surfaces of the continuously folded portion 45 of the filmic packaging material 44 together.

Figure 3:
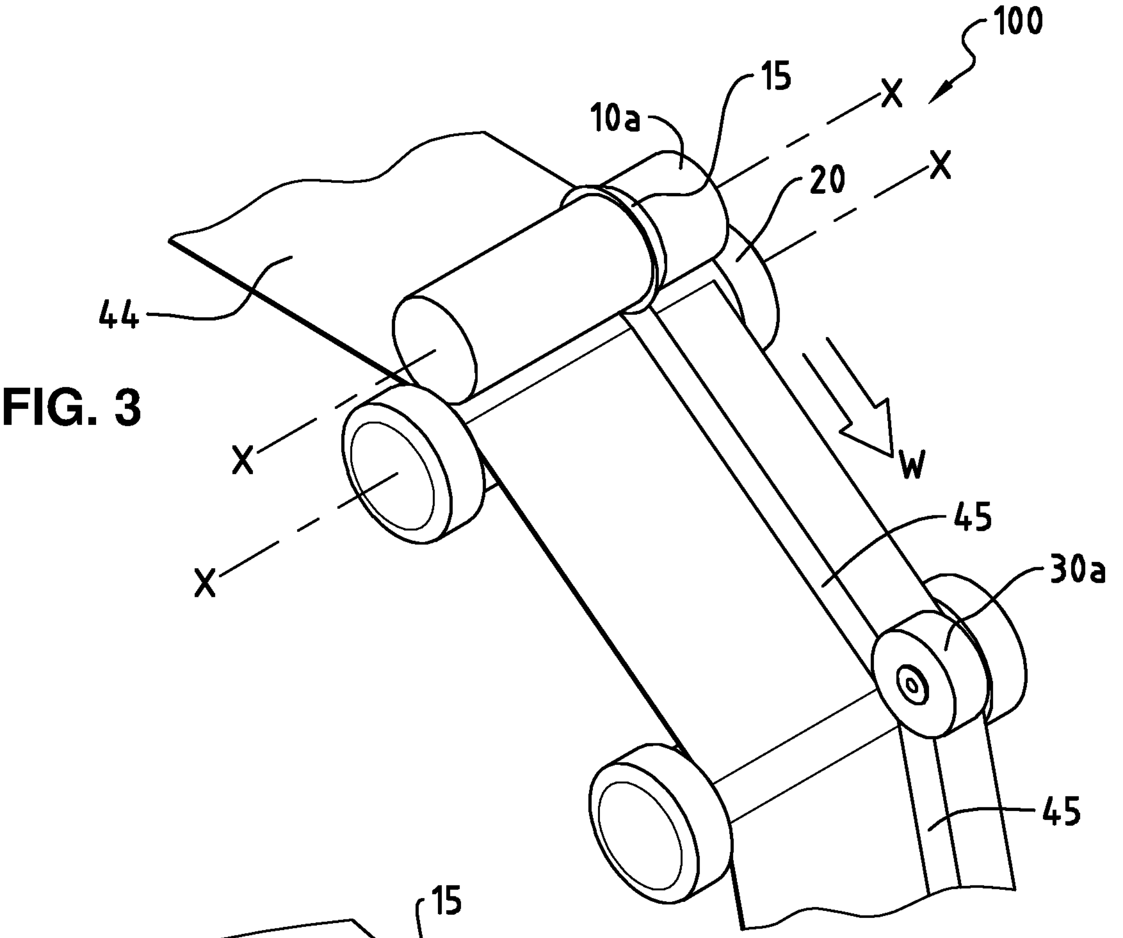
FIG. 3 shows a perspective view of a preferred embodiment of the apparatus 100 of the present invention, comprising a heating roller as a bonding means to adhere a said continuous folded portion in the filmic packaging material.

In one embodiment represented in FIG. 3, the bonding component 30 can be provided in form of a roller 30*a*, preferably a heating roller, configured and arranged such that sufficient heat is produced at the roller contacting surface with the filmic packaging material to slightly melt the filmic packaging material 44 such that the overlapping surfaces of the filmic packaging material 44 are adhered to each other and is heat-sealed.

Figure 4:
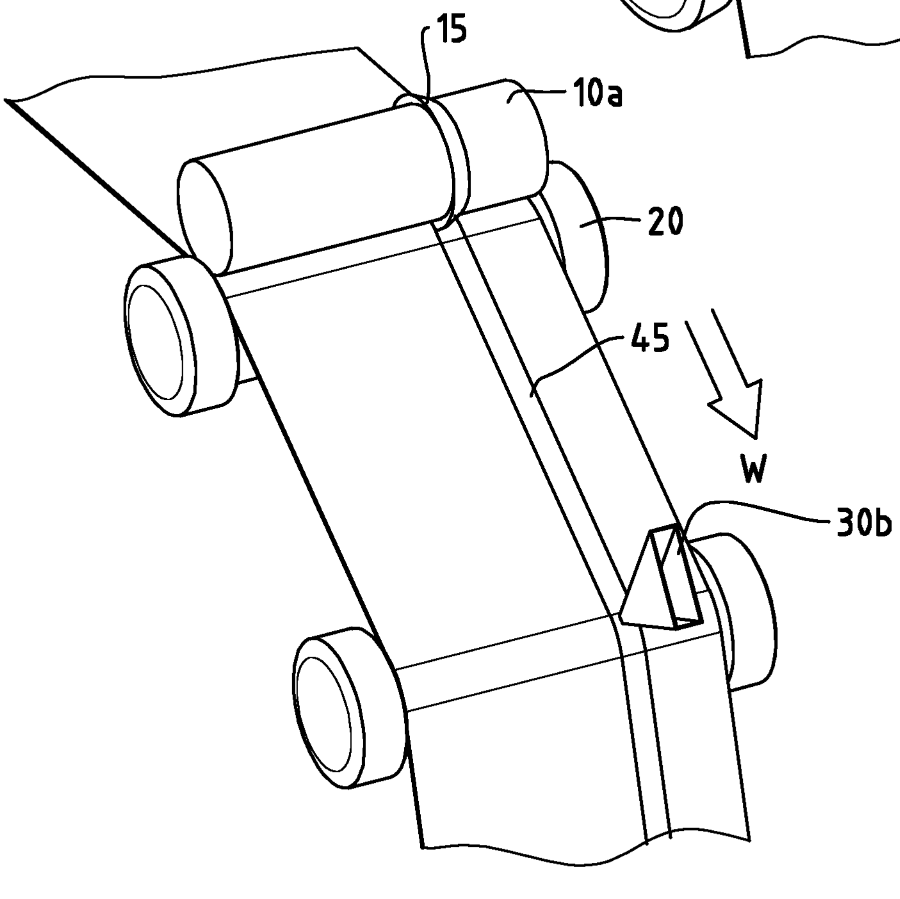
FIG. 4 shows a perspective view of a preferred embodiment of the apparatus 100 of the present invention, comprising a glue nozzle as a bonding means to adhere a said continuous folded portion in the filmic packaging material.

In another embodiment represented in FIG. 4, the bonding component 30 may be provided as a glue, or generally adhesive delivering nozzle 30*b*. Of course, any other suitable form of the bonding component 30 can be used to adhere the overlapping surfaces of the filmic packaging material 44.

In yet another embodiment, the bonding component 30 can also be used to provide a sticky adhesive material to the overlapping surfaces of the continuously folded portion 45. In this particular embodiment, the bonding component 30 can be incorporated to a tipping end of the protruding part 15 of the first component 10 such that the sticky material can be applied to the overlapping surface of the filmic packaging material where it is folded, thereby forming a continuously folded portion.

The bonding component 30 is advantageously arranged to adhere the opposite areas of filmic packaging material facing each other in the continuously folded portion 45, in order to strengthen it such that in forms a tear-tape equivalent integral to the filmic packaging material 44, with the longitudinal edges or boarders of the folded portion 45 forming thin tearing guides arranged to help tearing of the filmic material 44 along the folded portion 45 in use.

Figure 5:
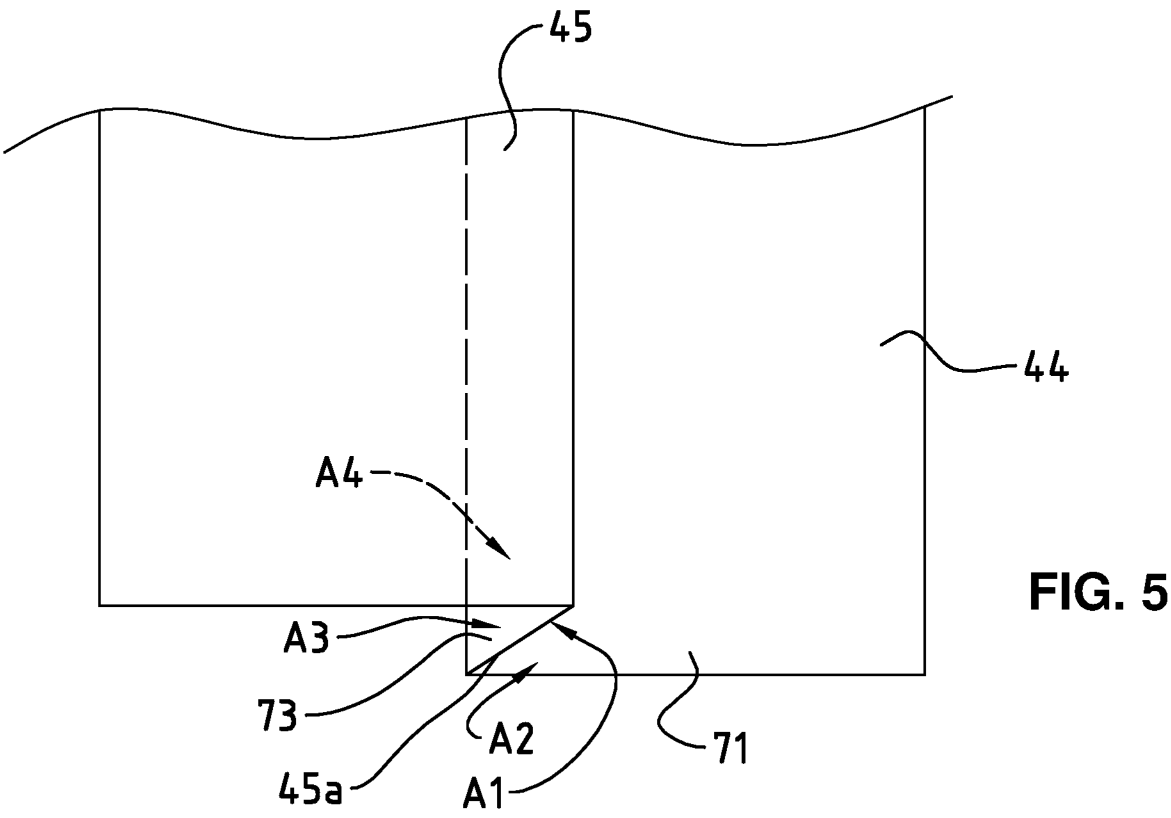
FIG. 5 shows a plan view of a continuously folded portion of filmic packaging material as it is processed and formed according to the method of the invention with the apparatus of FIGS. 2 to 4.

For example as represented in FIG. 5, a first area A1 of a medial ply 45*a* in the continuously folded portion 45 can be adhered to an underneath directly facing area A2 of a first face 71 of the filmic packaging material while a second surface A3 of said ply 45*a* opposite the first one can be adhered to a directly facing area A4, identified by a dashed arrow in the figure, in a second face 73 of the filmic packaging material.

The filmic packaging material 44 can be any high strength poly firm, such as polyethylene or polypropylene, with or without adhesive on one side of the strip. Perforations can further be provided beside the folded portion to allow an easy tearing of the filmic material 44, either at some preferred locations such as ends of the folded portion 45 or along all or only part of the adhered edges of said folded portion 45. The filmic packaging material 44 may further be printed or marked, for example with a laser, with a company name, logo, design, other statement or code such as QR code or bar code.

Figure 6:
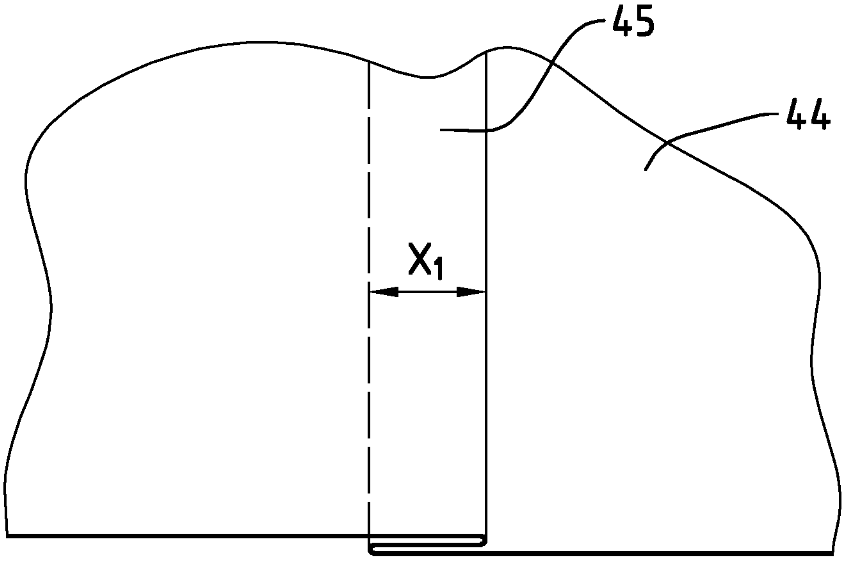
FIG. 6 shows the continuously folded portion obtained according to the folding principle shown in FIG. 5.

The overlapped areas A1-A4 forming the folded portion 45 have a substantially Z shape in a transversal section to the longitudinal traveling direction of the filmic packaging material 44 as shown in the FIG. 6. In this example, the filmic packaging material is being folded once. The width of the folded portion X1 is determined by the width of the groove 25 and/or the contact area of the tipping end of the protruding part 15 of the first component 10.

Figure 7:
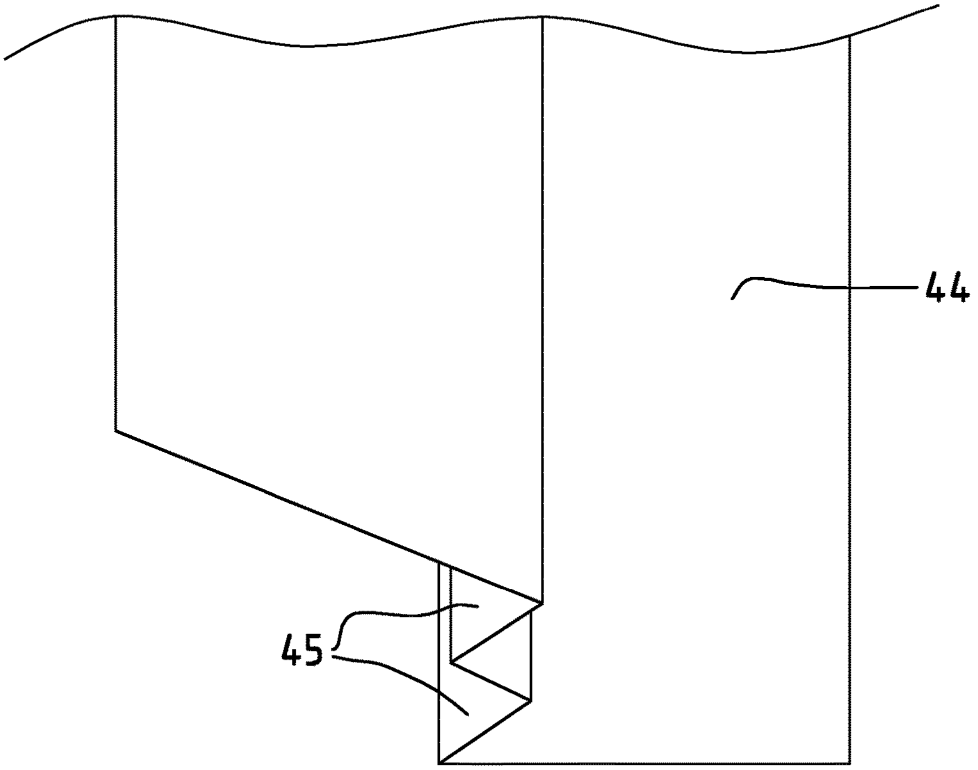
FIGS. 7 to 9 show plan views of alternative folding principles achievable according to the method of the invention in a filmic packaging material to provide an integral tear-opening feature in such a filmic material according to the method and apparatus of the invention.

The filmic packaging material 44 can also be folded more than once, for example folded twice where the folded portions are being stacked on top of each other as shown in the FIG. 7. This variation of the invention allows a stronger and thicker folded portion 45 to be created such that the tearing of the overwrap packaging is easier.

The width of the folded portion 45 which replaces the conventional tear-tape according to the present invention is typically between about 0.5 mm and 5 mm, preferably between about 0.8 mm and 3 mm, or more preferably between about 1 mm and 2 mm. The width of the folded portion 45 within these range allow the user to tear away the filmic packaging material 44 easily while maintaining the conventional appearance of the overwrap film.

To this end, it is noted that in all embodiments, the filmic packaging material 44 having the new generation tear-tape proposed herein can further be provided with a small cut at one tip of the filmic packaging material 44 nearby the folded portion 45 such that it allows the overwrap film to be torn away easily along the folded portion 45 and not across the folded portion.

Figure 8:
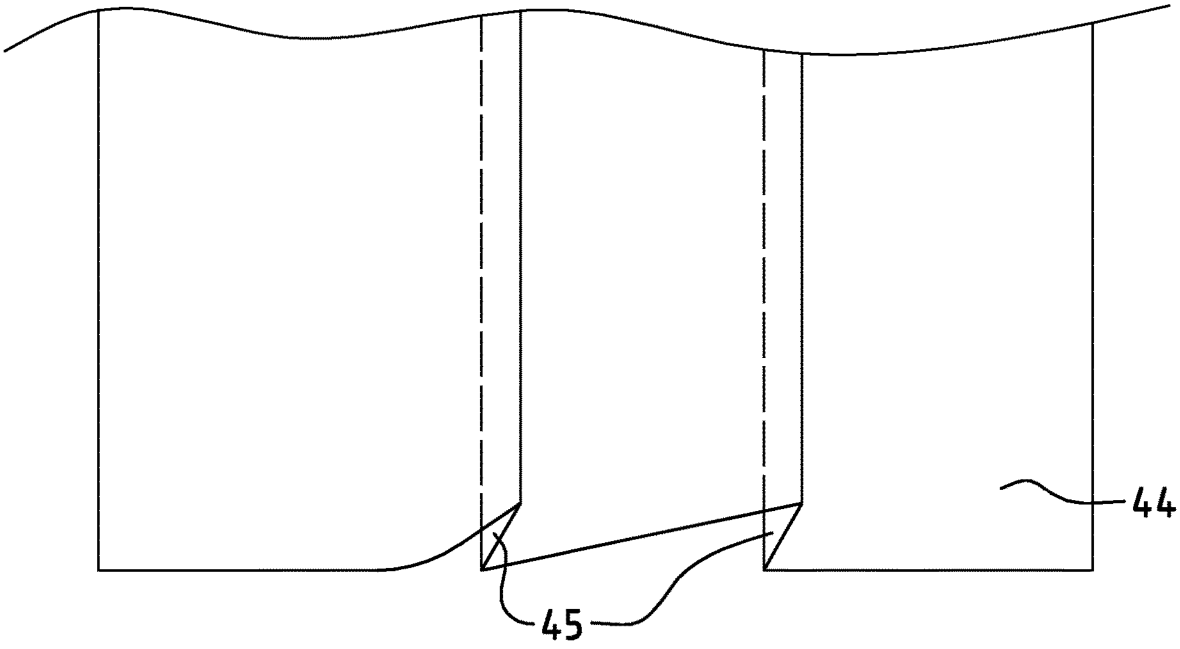
Figure 9:
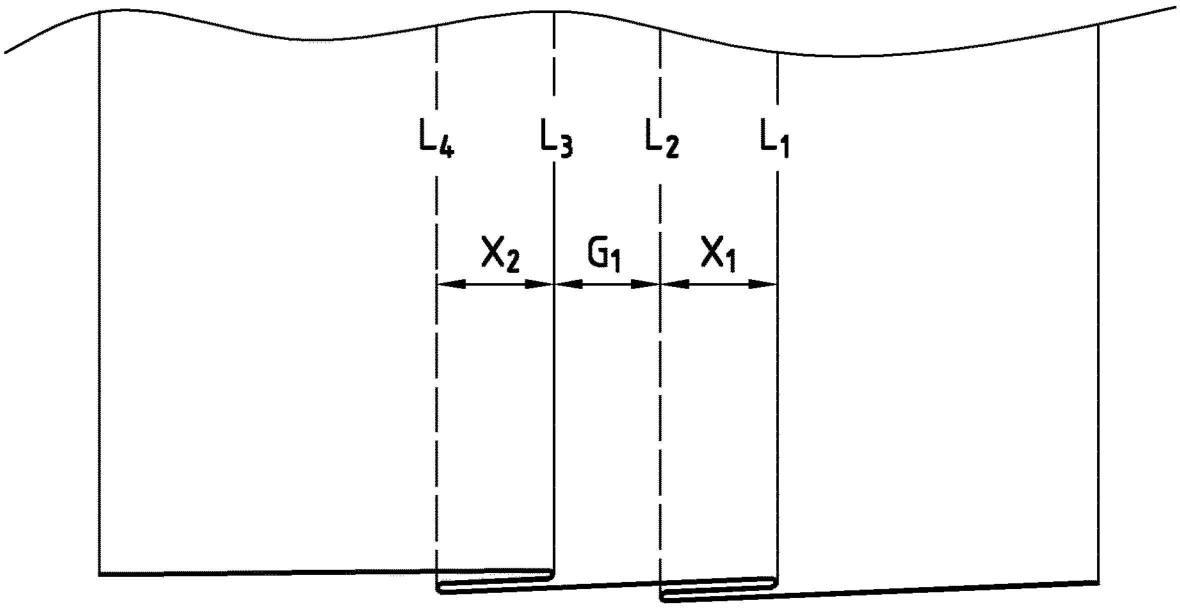

In one particular embodiment, the filmic packaging material 44 can be folded twice on different longitudinal positions of the filmic packaging material 44 as illustrated in the FIG. 8, thereby giving two substantially Z shape in the transversal section to the longitudinal traveling direction of the filmic packaging material (FIG. 9). Each of the successive folded portion (X1, X2) can have the same width if the same configuration of the protruding part 15 and groove 25 are used to produce the folded portions 45.

Furthermore, the gap G1 between the successive folded portions (X1 and X2) can be set in between 1 mm and 10 mm, preferably between 1 and 5 mm, or preferably between 2 mm and 3 mm. If two folded portions 45 are being provided on the filmic packaging material 44, the small cut can be provided within the area G1 such that the tearing of the filmic packaging material 44 can be limited within the space between L2 and L3 as shown in the FIG. 9. This will increase the easiness of tearing the filmic packaging material.

According to one embodiment, the protruding part 15 of the first component 10 can be not completely complimentary to the recess 25 of the first roller 20 but only partially insertable into the recess 25 of the first roller 20 but such arrangement is sufficient of forming a continuously folded portion 45 of the filmic packaging material 44.

In a further embodiment, a pair of additional rollers arranged in a "V-shaped", a "\/-shaped" or a "/\-shaped" in the traveling direction of the filmic packaging material can be provided either upstream or downstream of the protruding part 15 of the first component 10 in order to assist the folding of the filmic packaging material 44. Such arrangement will allow a more precise folding of the filmic packaging material 44 in order to obtain the desired width of the folded portion 45.

By "about" or "approximately" in relation to a given numerical value, it is meant to include numerical values within 10% of the specified value.

By "comprising" it is meant including, but not limited to, whatever follows the word "comprising". Thus, use of the term "comprising" indicates that the listed elements are required or mandatory, but that other elements are optional and may or may not be present. The terms "comprising" and "including" as used herein are interchangeable with each other.

By "consisting of" is meant including, and limited to, whatever follows the phrase "consisting of". Thus, the phrase "consisting of" indicates that the listed elements are required or mandatory, and that no other elements may be present.

The indefinite article "a" or "an" does not exclude a plurality, thus should be treated broadly.

By "one or more" or "at least one" it is meant to include the whole numbers include 1, 2, 3, 4, 5 and more up to a number which can be applied and understood by a skilled person in the art.

The invention claimed is:

1. An apparatus for producing a filmic packaging material having a continuously folded portion, comprising a first component comprising a protruding part;

a first roller rollable about a longitudinal axis thereof, wherein the first roller is provided with a recess on an outer surface thereof for receiving the protruding part of the first component;

a drive mechanism for moving the filmic packaging material along a path in a manner such that a continuous portion of the filmic packaging material is drawn into the recess of the first roller by the protruding part of the first component such that the continuous portion of the filmic packaging material is folded, forming a continuously folded portion having an overlapping surface due to the arrangement of the protruding part of the first component in relation to the recess of the first roller; and a bonding component provided downstream of the first roller arranged to adhere together the overlapping surface of the continuously folded portion of the filmic packaging material, wherein the protruding part is provided in a wedge shape arranged tilted towards one side, wherein the protruding part of the first component is receivable by the recess of the first roller having a complimentary shape to the protruding part so as to allow the formation of the continuously folded portion of the filmic packaging material.

2. The apparatus according to claim 1, wherein the first component is a second roller, comprising said protruding part on an outer surface thereof, said second roller pivoting about a longitudinal axis parallel to the longitudinal axis of the first roller.

3. The apparatus according to claim 2, wherein the first and second rollers are arranged in such a way that each of the first and second rollers spins on its respective longitudinal axis, such that the continuously folded portion having the overlapping surface is formed when the first and second rollers feed in the filmic packaging material therebetween.

4. The apparatus according to claim 3, wherein the second roller is served as an upper pressing roller.

5. The apparatus according to claim 1, wherein the protruding part of the first component, and the recess of the first roller are provided either in a repeated interval along respective circumferences thereof or extending along their respective entire circumferences, arranged in such a way that the protruding part and the recess are complimentary to each other so as to allow for the formation of the continuously folded portion of the filmic packaging material.

6. The apparatus according to claim 1, wherein a width of the recess is between 0.5 mm and 5 mm.

7. The apparatus according to claim 6, wherein the width of the recess is between 0.8 mm and 3 mm.

8. The apparatus according to claim 6, wherein the width of the recess is between 1 mm and 2 mm.

9. The apparatus according to claim 1, wherein the bonding component is a roller, a nozzle or a block which is rollable or static.

10. The apparatus according to claim 1, wherein the bonding component is configured to exert heat to the filmic packaging material.

11. The apparatus according to claim 1, wherein the recess of the first roller extends around an entire circumference of the first roller.

12. The apparatus according to claim 1, wherein the bonding component is configured to provide a sticky material to the filmic packaging material, wherein the sticky material includes a glue or a self-adhesive material.

13. A method of producing filmic packaging material having a continuously folded portion, comprising:

a. providing a filmic packaging material in between a first roller having a recess on an outer surface thereof and a first component having a protruding part, wherein the protruding part is provided in a wedge shape arranged tilted towards one side, and the recess of the first roller has a complimentary shape to the protruding part;

b. feeding through the filmic packaging material between the first roller and the first component;

c. drawing in a continuous portion of the filmic packaging material to the recess of the first roller by the protruding part of the first component that is received by the recess;

d. folding the continuous portion of the filmic packaging material, forming an overlapping surface of the filmic packaging material; and e. adhering the overlapping surface of the folded portion of the filmic packaging material.

14. The method according to claim 13, further comprising a step of reeling up the folded and adhered filmic packaging material.

15. The method according to claim 13, wherein the step of adhering includes heating or melting the filmic packaging material.

16. The method according to claim 13, wherein the step of providing includes providing the filmic packaging material in between the first roller having the recess on the outer surface thereof that extends around an entire circumference of the first roller and the first component having the protruding part.

17. The method according to claim 13, wherein the step of providing includes the protruding part of the first component having a tipping end.

18. The method according to claim 13, wherein the filmic packaging material comprises a first face and a second face, wherein the step of adhering includes adhering the first face to the first face, or adhering the second face to the second face.

19. The method according to claim 13, wherein the step of adhering includes providing a sticky material to the filmic packaging material, wherein the sticky material includes a glue or a self-adhesive material.

20. The method according to claim 13, further comprising providing perforations extending along the overlapping surface to allow tearing of the filmic packaging material.

* * * * *